United States Patent
Seki et al.

(10) Patent No.: US 7,503,635 B2
(45) Date of Patent: Mar. 17, 2009

(54) INK JET PRINTING METHOD AND INK JET PRINTING APPARATUS

(75) Inventors: Satoshi Seki, Kawasaki (JP); Jun Yasutani, Kawasaki (JP); Atsushi Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/060,396

(22) Filed: Apr. 1, 2008

(65) Prior Publication Data
US 2008/0246793 A1 Oct. 9, 2008

(30) Foreign Application Priority Data
Apr. 6, 2007 (JP) ............... 2007-100273

(51) Int. Cl.
*B41J 2/205* (2006.01)
(52) U.S. Cl. .............. 347/15; 347/41; 358/1.2; 358/1.9
(58) Field of Classification Search ........... 347/12, 347/15, 43, 41, 19; 358/3.02, 3.03, 3.04, 358/3.05, 3.06, 1.2, 1.9
See application file for complete search history.

(56) References Cited

U.S. PATENT DOCUMENTS

| 4,999,646 | A | 3/1991 | Trask |
| 6,164,745 | A | 12/2000 | Nagoshi et al. |
| 6,312,102 | B1 * | 11/2001 | Moriyama et al. ............ 347/43 |
| 6,334,666 | B1 * | 1/2002 | Inui et al. ............ 347/43 |
| 6,652,066 | B2 * | 11/2003 | Teshigawara et al. ......... 347/41 |
| 2007/0097164 | A1 | 5/2007 | Marumoto |
| 2007/0109604 | A1 | 5/2007 | Marumoto |

FOREIGN PATENT DOCUMENTS

| JP | 6-336016 A | 12/1994 |
| JP | 2006-44258 A | 2/2006 |

OTHER PUBLICATIONS

T. Mitsa et al., "Digital Halftoning Using a Blue Noise Mask", Image Processing Algorithms And Techniques II, SPIE The International Society for Optical Engineering, Feb. 25-Mar. 1, 1991, pp. 47-56, vol. 1452.

* cited by examiner

*Primary Examiner*—Lamson D Nguyen
(74) *Attorney, Agent, or Firm*—Fitzpatrick, Cella, Harper & Scinto

(57) ABSTRACT

An object of the present invention is to provide an ink jet printing method and ink jet printing apparatus capable of outputting a smooth monochrome photograph with indistinctive beading and conveying unevenness even in monochrome black mode for printing an image by using achromatic color inks. For this object, if it is determined that printing is carried out in the monochrome black mode, different mask patterns, such as mutually-exclusive mask patterns or mask patterns having a logical product result that shows a state where low-frequency components are less than high-frequency components, are set for two or more kinds of achromatic color inks. Use of such mask patterns suppresses the generation of grains of achromatic color inks, increases dispersibility of the grains, and also makes positions where conveying unevenness appear indistinctive.

7 Claims, 14 Drawing Sheets

FIG.2A CASE WHERE SHAPE OF ROLLER IS PERFECT CIRCLE

FIG.2B CASE WHERE SHAPE OF ROLLER IS ELLIPSE

MASK E    MASK F
1 PASS  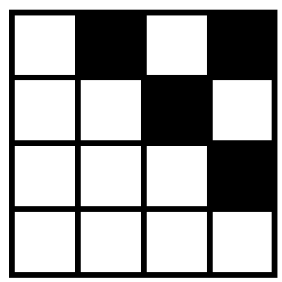 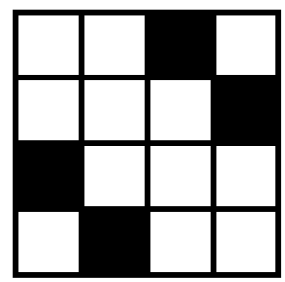
2 PASS  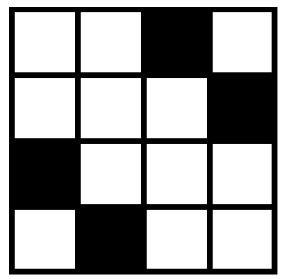
3 PASS  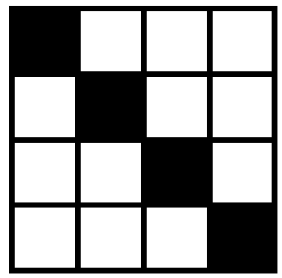
4 PASS  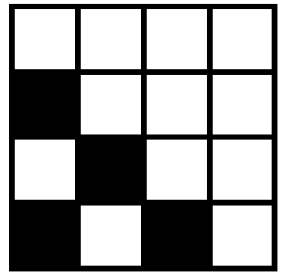 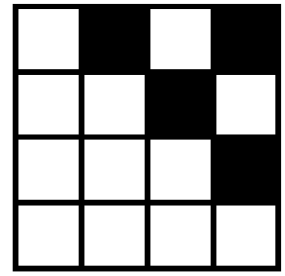
FIG.8

|  | Bk | Gray | LGray |
|---|---|---|---|
| MASKSET 1 | MASK A | MASK A | MASK A |
| MASKSET 2 | MASK A | MASK B | MASK C |

FIG.9

| INK TYPE | MASK A<br>Bk,Gray<br>LGray | MASK B<br>C,LC | MASK C<br>R,G | MASK D<br>M,LM,Y |
|---|---|---|---|---|
| 1 PASS | | | | |
| 2 PASS | | | | |
| 3 PASS | | | | |
| 4 PASS | | | | |

FIG.13

| INK TYPE | MASK A<br>Bk | MASK B<br>Gray, LC | MASK C<br>L, Gray | MASK D<br>LM, Y |
|---|---|---|---|---|
| 1 PASS | 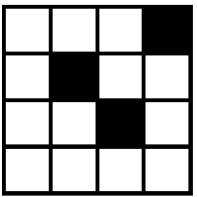 | 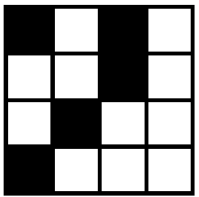 | 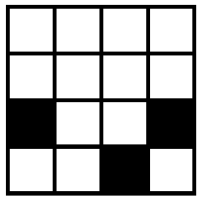 | 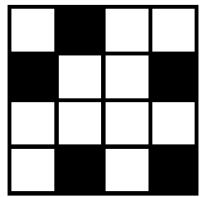 |
| 2 PASS | 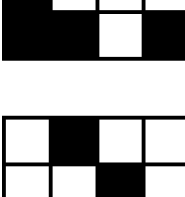 | 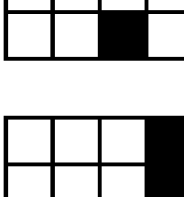 | 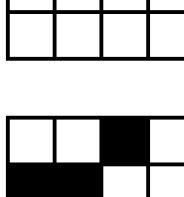 | 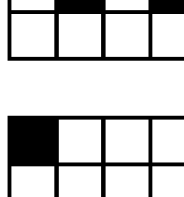 |
| 3 PASS | 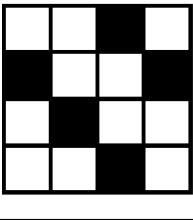 | 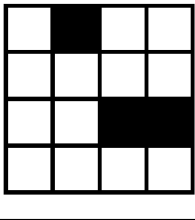 | 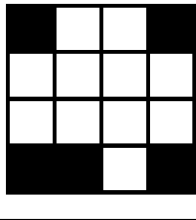 | 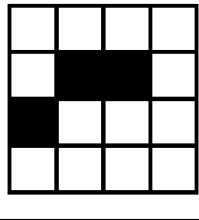 |
| 4 PASS | | | | |
FIG.14

INK JET PRINTING METHOD AND INK JET PRINTING APPARATUS

BACKGROUND OF THE INVENTION

1. Field of the Invention

The present invention relates to an ink jet printing method and ink jet printing apparatus for printing an image on a print medium by using a print head.

2. Description of the Related Art

Ink jet printing apparatuses whose market has been expanded recently becomes capable of outputting not only office documents mainly on plain paper, but also images on special paper with nearly the same quality as that for silver halide photography. This achievement of high quality printing is greatly attributable to technologies of decreasing the granularity of images. The technologies include a technology of ejecting ink drops in very small size with high density from ink jet print heads, and a technology of printing an image by additionally using a light-color ink having lower density of colorant in ink than a regular one.

As for the light-color ink, light cyan and light magenta are generally used. In addition, a large number of printing apparatuses have been proposed to provide a monochrome photograph with higher image quality. Such a printing apparatus is provided with several achromatic color inks different in brightness, such as gray and light gray. Furthermore, an ink jet printing apparatus having a secondary color inks, such as red, green or blue, prepared in advance has also been provided to further widen a color reproduction range.

In this manner, in the situation that an image with high resolution is formed by using several kinds of inks, an amount of ink to be applied to a unit area is increased more than ever before. Then, if a print medium cannot absorb ink as fast as the apparatus applies ink, ink drops applied onto the same position or close positions are attracted with each other by the surface tension of the ink drops. As a result, an adverse effect of image called beading is caused.

Against the beading problem, for example, there is disclosed a technology in the specification of U.S. Pat. No. 4,999,646. In this technology, only some of print pixels being not adjacent to each other and arranged in a lattice pattern are firstly printed with ink in the first print scanning, and then residual print pixels are printed in the second print scanning. With this printing, the contact and attraction of ink drops printed in the same print scanning are avoided as much as possible, so that beading can be suppressed.

In addition, Japanese Patent Laid-open No. H06-336016 discloses a printing technology obtained by further applying the printing method disclosed in the specification of U.S. Pat. No. 4,999,646 to color printing. Japanese Patent Laid-open No. H06-336016 describes a printing method for solving various problems relating to ink jet color printing in addition to the above-described beading by preparing different mask patterns for different colors of inks in order to carry out multipass printing (multi-scans printing). In addition, Japanese Patent Laid-open No. H06-336016 discloses the configuration for making print through four passes in multipass printing by using mutually-exclusive four mask patterns so as not to overlap two or more colors of ink drops on one print pixel in a single print scanning.

However, under the recent circumstances where kinds of used inks have been rapidly increased, it is difficult to make pixels, which are printed in a single print scanning, exclusive for all kinds of inks completely. For example, if four colors of C, M, Y, and Bk are used for the multipass printing with four passes, completely exclusive mask patterns can be prepared for these four inks. However, if five or more colors of inks are used, it is not possible to prepare mask patterns giving such an exclusive relationship to all colors of inks. In the latter case, in a single print scanning, two or more colors of inks are inevitably printed on one print pixel by any means. As a result, in such a pixel, a lump (grain) of ink to easily cause beading is generated.

Against the problem, for example, Japanese Patent Laid-open No. 2006-44258 discloses mask patterns which cause dots of each color to be arranged as dispersedly as possible on a print medium in one print scanning of the multipass printing in the course of the superposition of the colors. With this, even when grains are generated by two or more colors of inks, these grains are arranged dispersedly, that is, with less low-frequency components than high-frequency components. Accordingly, the grains are more indistinctive and beading is less likely to occur.

As described above, recently, an ink jet printing apparatus has become capable of outputting a color image using a large number of ink colors, with high uniformity, by use of the mask patterns as disclosed in Japanese Patent Laid-open No. 2006-44258.

Meanwhile, recently, there is another type of ink jet printing apparatus proposed with a special mode for outputting monochrome photographs (herein after referred to as a monochromatic black mode). In this monochrome black mode, gradation of gray is reproduced by mainly achromatic color ink likes black, gray or light gray, and color inks (chromatic inks) are hardly used. In other words, the ink kind used mainly for monochrome black mode is different from that for color mode. Then, in the monochrome black mode, if the same mask patterns as those for a color mode are used, there is a case in which beading may be recognized easily.

In addition, in the monochrome black mode, even a slight error in the printing apparatus main body produces distinctive harmful effects on a formed image, although such an error does not cause a serious problem in the color mode. A mechanical error included in the printing apparatus generates non-uniformity in the dot arrangement formed by ink ejected from printing heads. The smaller size and the higher optical density a used ink drop has, the more easily such non-uniformity is recognized as density unevenness. In particular, density unevenness attributable to an error of a conveying roller conveying a print medium has been one of significant problems in the recent monochrome black mode printing. The density unevenness accompanied by such a conveying error will be described below in detail.

FIG. 1 is a schematic configuration view for illustrating each mechanism of a general serial-type ink jet printing apparatus. Driving force of a carriage motor 2 rotates a carriage belt 4, which is suspended in a tensioned state in the apparatus, and a carriage 1 connected with this carriage belt 4 moves in a main scanning direction in the figure. An unillustrated encoder sensor provided to the carriage 1 reads a pattern of a linear encoder that extends in parallel with the carriage belt 4, and thereby a current position and speed of the carriage 1 can be measured. A print head ejecting ink is mounted on the carriage 1. The print head ejects ink, according to the position information obtained by the encoder sensor and image data, while moving (scanning) in the main scanning direction.

When one print scanning by the print head is completed, a conveying roller 5 rotates along with rotation of a conveying motor 6 to convey a print medium 10, which is in contact with the conveying roller 5, by a predetermined amount in a sub-scanning direction. The driving force is transmitted from the conveying motor 6 to the conveying roller 5 via a conveying belt 8. A rotary encoder 7 having a concentric rotation axis with the conveying roller 5 is attached to the conveying roller 5. The rotation amount of the rotary encoder 7, that is, the conveying amount of the print medium by the conveying roller 5 is measured by an encoder light-receiving unit 11 fixed to the apparatus.

However, even if the rotation amount of the conveying roller 5 can be detected with relatively high-accuracy, when eccentricity, shape deformation, deflection or the like is present in the conveying roller 5, a deviation occurs between the rotation amount of the conveying roller 5 and the conveying amount of the print medium 10. Then, the deviation of the substantial conveying amount from the detected rotation amount appears as density unevenness having cycles each corresponding to one rotation of the conveying roller.

FIGS. 2A and 2B are cross-sectional views of the conveying roller for illustrating deviation of the conveying amount from the rotation amount, which is attributable to the deformation of the conveying roller 5. FIG. 2A shows a case where the cross section of the conveying roller 5 is a perfect circle, while FIG. 2B shows cases where the cross sections are two types of ellipses. If the cross-section of the conveying roller 5 is a perfect circle, the conveying amount L0 relative to the rotation amount R of the conveying roller 5 is a constant value. That is, the conveying amount relative to the rotation amount R is L0 on the side in any position of the conveying roller 5. In contrast, if the cross-section of the conveying roller 5 is an ellipse, the conveying amount relative to the rotation amount R of the conveying roller 5 varies depending on a position of the side. The figures show the positions of L1 and L2 having the largest and smallest conveying amounts relative to the same rotation amount R, respectively. In this case, the relationship of L1>L0>L2 is established. Such variations of the conveying amount appear as density unevenness if multipass printing is carried out.

FIG. 3 is a view for illustrating how variations of the above-described conveying amount cause density unevenness in a multipass printing. The left side in the figure shows phases of the conveying roller, the center shows directions in which dot landed positions are deviated in the respective phases, and the right side shows non-uniformity of dots actually printed on a print medium.

If the phase of the conveying roller 5 is L1, the conveying amount is larger than a normal amount. Accordingly, the dot is printed in a position which is advanced from an ideal position in conveying direction. In contrast, if the phase of the conveying roller 5 is L2, the conveying amount is smaller than the normal amount. Accordingly, the dot is printed in a position which is behind the ideal position in conveying direction. For this reason, even if an image having a uniform tone is printed, non-uniformity in the dot arrangement having cycles each corresponding to one rotation of the conveying roller, that is, variations of area factor appear as density unevenness in stripes. Such non-uniformity of dots arrangement and density unevenness are caused not only by the deformation of the conveying roller 5, which is shown in FIG. 2, but also by eccentricity or deflection of the conveying roller 5. The density unevenness caused as described above are referred to as conveying unevenness in the present specification.

Such conveying unevenness is not so distinctive in the color mode in which an image is printed by using many kinds of inks. However, in the monochrome black mode in which an image is printed by using mainly achromatic color inks, the conveying unevenness is particularly distinctive and thus causes an adverse effect on an image.

SUMMARY OF THE INVENTION

The present invention has been made to solve the foregoing problems. Specifically, an object of the present invention is to provide an ink jet printing method and an ink jet printing apparatus capable of outputting a smooth monochrome photograph with indistinctive beading or conveying unevenness even in the monochrome black mode for printing an image by using achromatic color inks.

The first aspect of the present invention is an ink jet printing method for carrying out multi-scans printing to complete an image to be printed in a unit region on a print medium by a plurality of scans of a print head relative to the unit region, the print head capable of ejecting at least a first achromatic color ink and a second achromatic color ink, comprising the steps of: determining whether to carry out the multi-scans printing in a color mode or in a monochrome black mode; and setting mask patterns used for carrying out the multi-scans printing according to a result determined in said determining step, wherein if it is determined that the multi-scans printing is carried out in the color mode in said determining step, the same mask patterns are set for the first and second achromatic color inks in said setting step, and if it is determined that the multi-scans printing is carried out in the monochrome black mode in said determining step, a plurality of different mask patterns are set for the first and second achromatic color inks in said setting step.

The second aspect of the present invention is an ink jet printing apparatus capable of carrying out multi-scans printing to complete an image to be printed in a unit region on a print medium by a plurality of scans of a print head relative to the unit region, the print head capable of ejecting at least a first achromatic color ink and a second achromatic color ink, the ink jet printing apparatus comprising: setting unit capable of setting a color mode for carrying out the multi-scans printing and a monochrome black mode for carrying out the multi-scans printing; and selecting unit which selects mask patterns used for carrying out the multi-scans printing according to the mode set by said setting unit, wherein said selecting unit selects the same mask patterns for the first and second achromatic color inks if the color mode is set by said setting unit, and said selecting unit selects a plurality of different mask patterns for the first and second achromatic color inks if the monochrome black mode is set by said setting unit.

The third aspect of the present invention is an ink jet printing method of carrying out multi-scans printing to complete an image to be printed in a unit region on a print medium by a plurality of scans of a print head relative to the unit region, the print head capable of ejecting at least a first achromatic color ink and a second achromatic color ink, comprising the steps of: setting a monochrome black mode for carrying out the multi-scans printing using at least the first and second achromatic color inks; and selecting mask patterns, for the first and second achromatic color inks, used for carrying out the multi-scans printing if the monochrome black mode is set in said setting step, wherein the mask pattern for the first achromatic color ink selected in said selecting step is different from the mask pattern for the second achromatic color ink selected in said selecting step.

The fourth aspect of the present invention is an ink jet printing apparatus for carrying out multi-scans printing to complete an image to be printed in a unit region on a print medium by a plurality of scans of a print head relative to the unit region, the print head capable of ejecting at least a first achromatic color ink and a second achromatic color ink, comprising: setting unit that sets a monochrome black mode for carrying out the multi-scans printing using at least the first and second achromatic color inks; and selecting unit that selects mask patterns for the first and second achromatic color inks, used for carrying out the multi-scans printing if the monochrome black mode is set by said setting unit, wherein the mask pattern for the first achromatic color ink selected by said selecting unit is different from the mask pattern for the second achromatic color ink selected by said selecting unit.

The fifth aspect of the present invention is an ink jet printing method of carrying out multi-scans printing to complete an image to be printed in a unit region on a print medium by a plurality of scans of a print head relative to the unit region, the print head capable of ejecting three or more achromatic color inks, comprising the steps of: setting a monochrome black mode for carrying out the multi-scans printing using at least the first and second achromatic color inks; and selecting mask patterns for the three or more achromatic color inks, used for carrying out the multi-scans printing if the monochrome black mode is set in said setting step, wherein the mask patterns for the three or more achromatic color inks selected in said selecting step are different from each other.

Further features of the present invention will become apparent from the following description of exemplary embodiments.

BRIEF DESCRIPTION OF THE DRAWINGS

FIG. 8 shows examples of mask patterns which are mutually exclusive;

FIG. 9 is a table for illustrating contents of MaskSet1 and MaskSet2;

FIG. 13 is a view showing an example of mask pattern of MaskSet1; and

FIG. 14 is a view showing an example of mask pattern of MaskSet2.

DESCRIPTION OF THE EMBODIMENTS

First Embodiment

Figure 1:
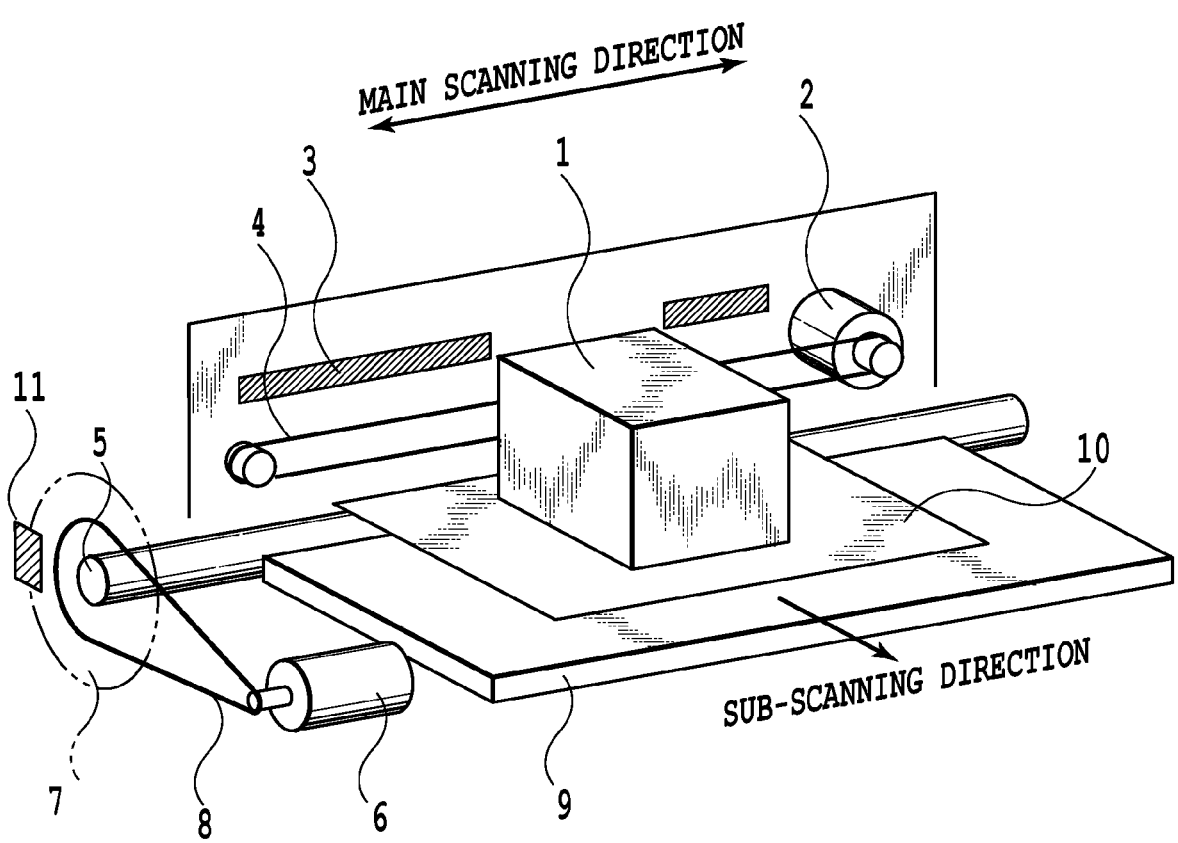
FIG. 1 is a schematic configuration view for illustrating mechanisms of a general serial-type ink jet printing apparatus.
Figure 2:
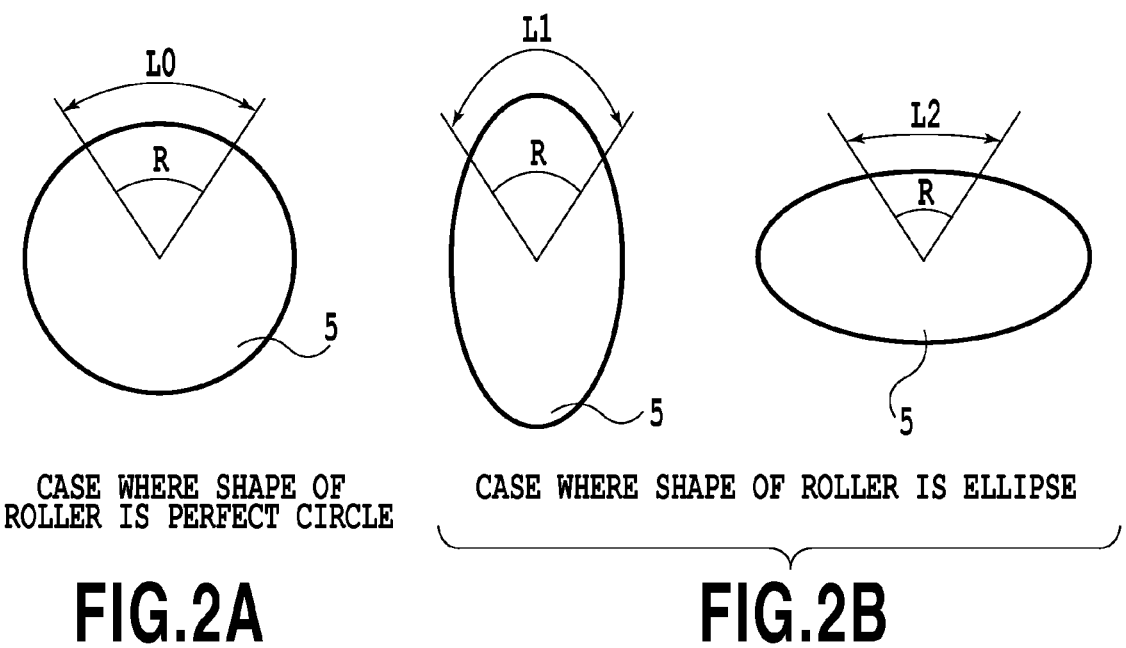
FIGS. 2A and 2B are cross-sectional views of a conveying roller for illustrating deviation of a conveying amount in relation to a rotation amount, which is attributable to deformation of the conveying roller.
Figure 3:
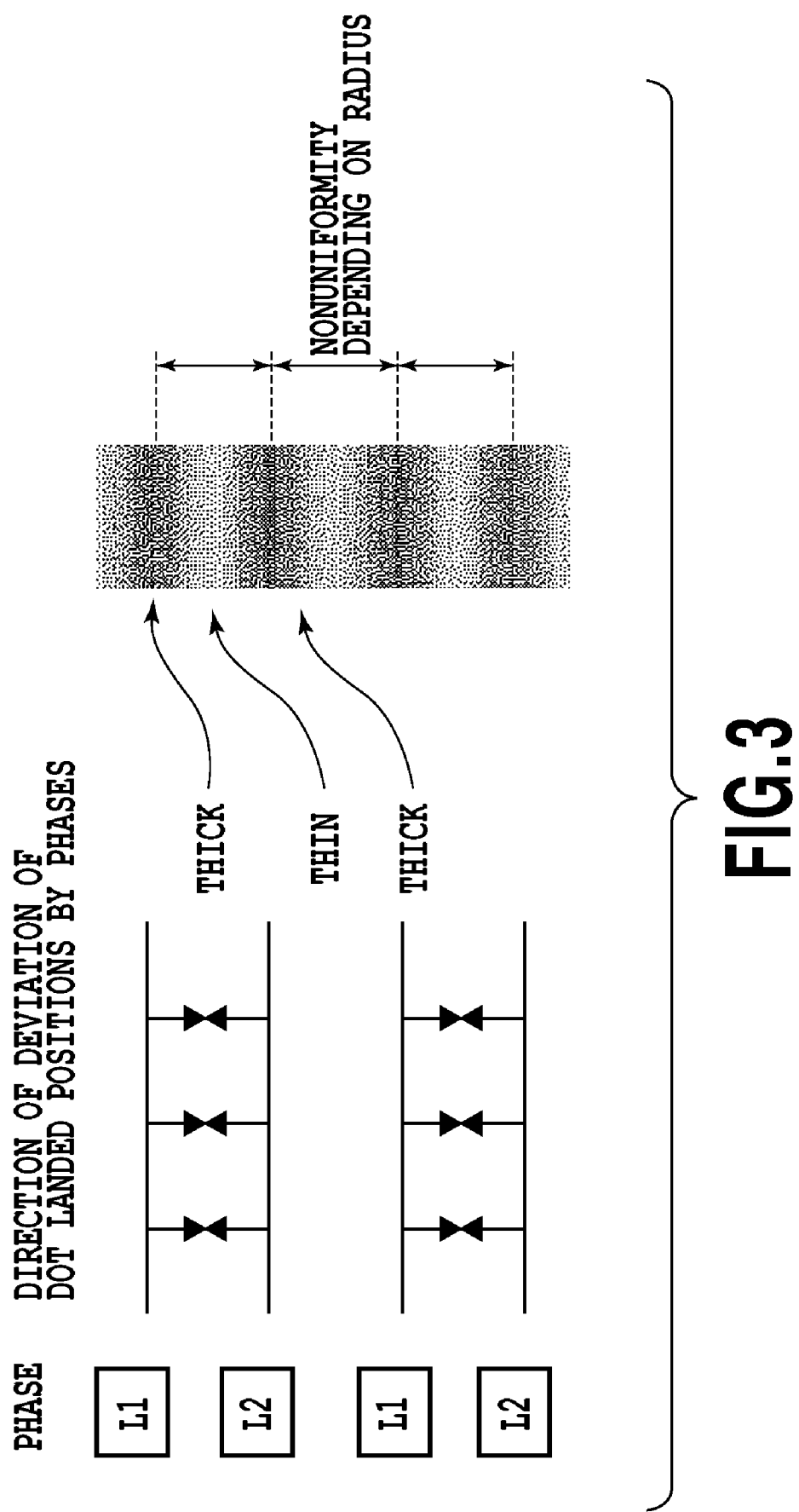
FIG. 3 is a view for illustrating how variations of the conveying amount cause density unevenness in multipass printing.

In the present embodiment, an image is formed by using a printing apparatus shown in FIG. 1.

Figure 4:
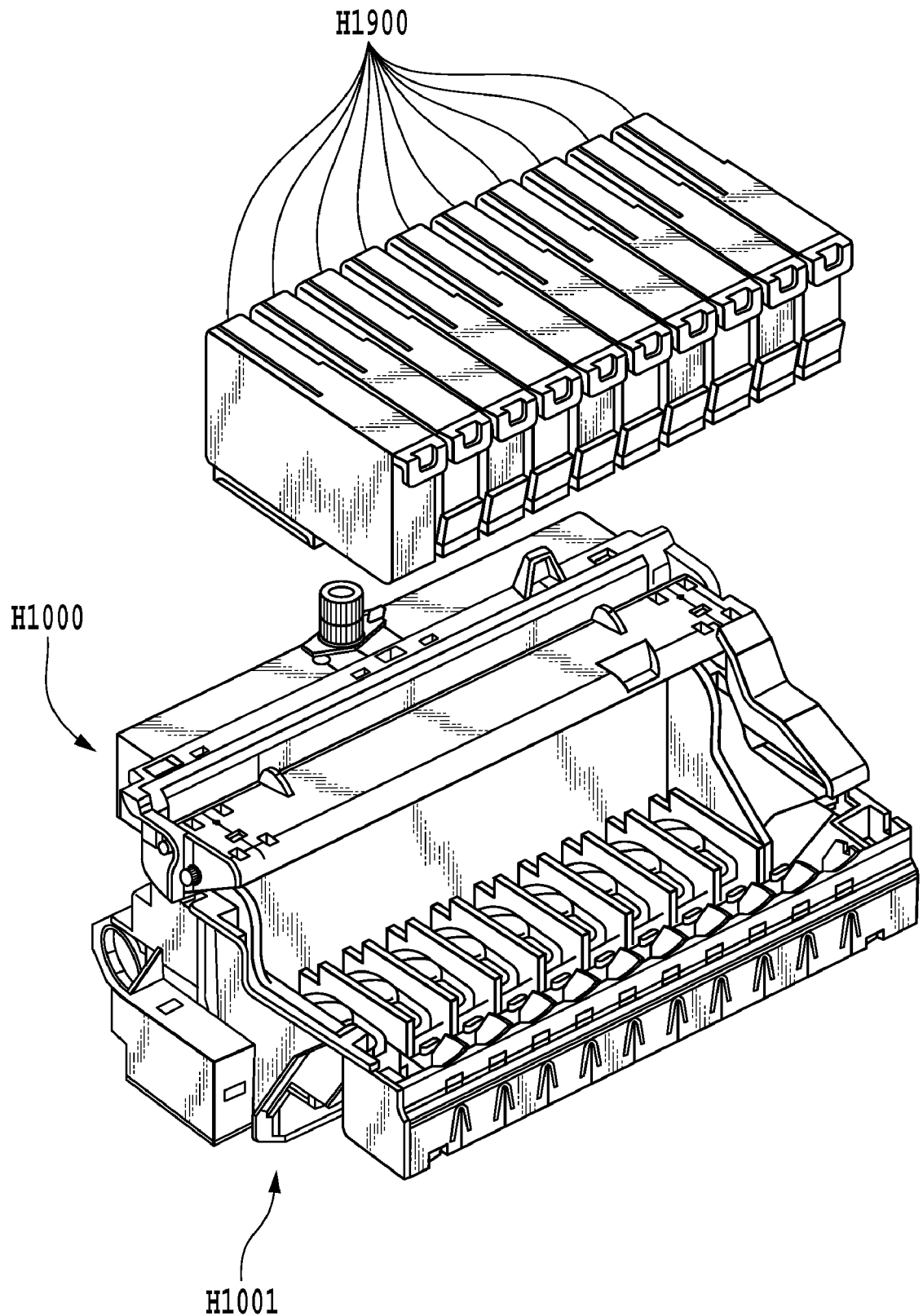
FIG. 4 is a perspective view for illustrating the configuration of a print head cartridge to be mounted on a carriage.

FIG. 4 is a perspective view for illustrating the configuration of a print head cartridge H1000 to be mounted on a carriage 1. The print head cartridge H1000 of the present embodiment is provided with print heads H1001 for ejecting ten colors of ink separately, and ten ink tanks H1900 for separately storing the ink are detachably mounted thereon. Here, the ten colors of ink used in the present embodiment include cyan (C), light cyan (Lc), magenta (M), light magenta (Lm), yellow (Y), black (Bk), gray (Gray), light gray (LGray), red (R), and green (G). Among these, there are three kinds of ink, which are referred to as achromatic color ink, that is, black (Bk), gray (Gray), and light gray (LGray). A lightness of gray ink is higher than a lightness of black ink, and a lightness of light gray ink is higher than the lightness of gray ink. On the other hand, chromatic color ink includes seven kinds of ink, that is, cyan (C), light cyan (Lc), magenta (M), light magenta (Lm), yellow (Y), red (R), and green (G). A coloring agent used for each of the above-described colors may be a pigment or a dye.

Figure 5:
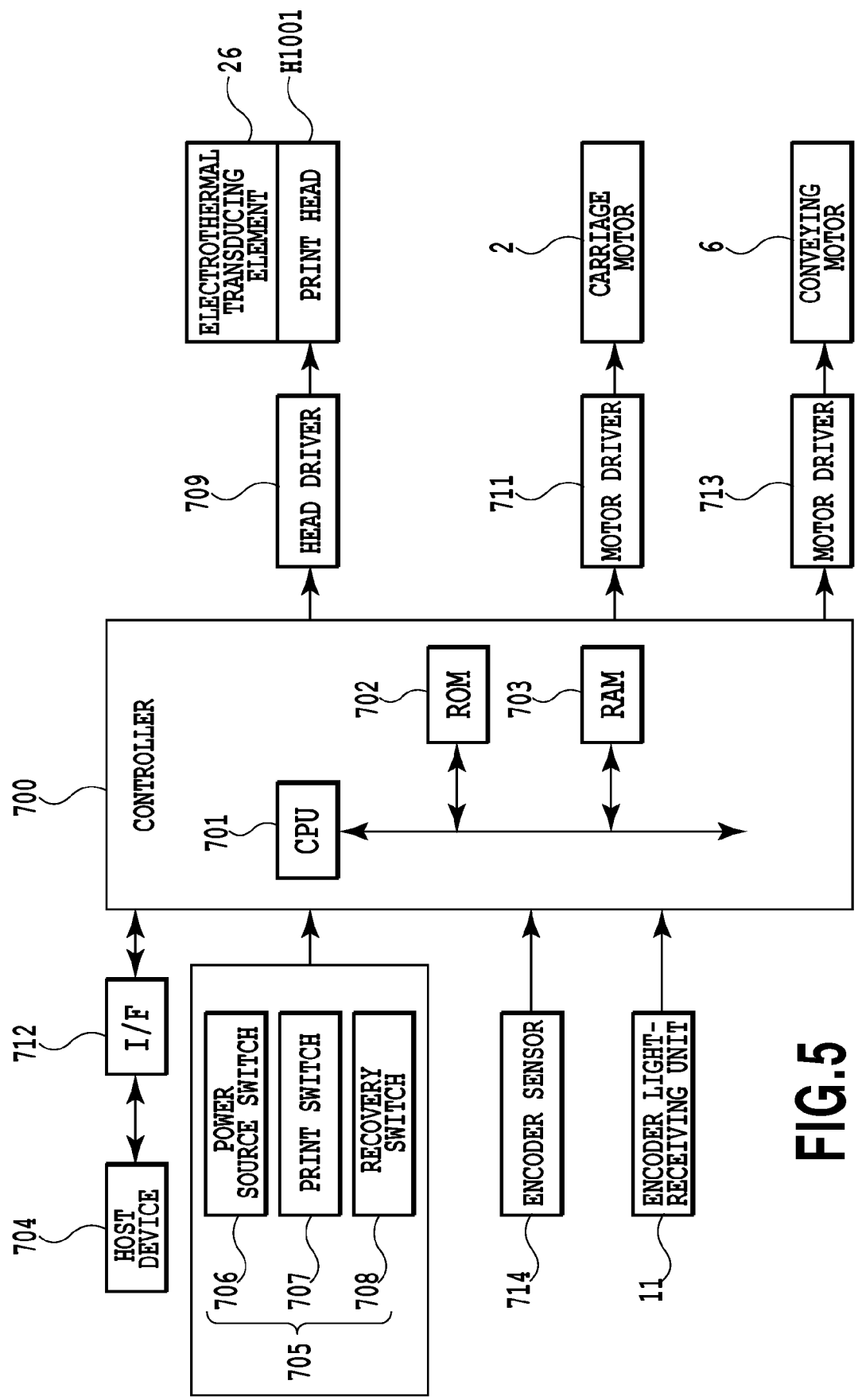
FIG. 5 is a block diagram for illustrating the configuration of controlling the ink jet printing apparatus of the present embodiment which is applicable to the present invention.

FIG. 5 is a block diagram for illustrating the configuration of controlling an ink jet printing apparatus of the present embodiment. In the figure, a controller 700 is a main control unit and is provided with, for example, a CPU 701 in a micro computer form, a ROM 702 in which programs, required tables, and other fixed data are stored, and a RAM 703 in which a region for developing image data, a region for operations, and the like are provided. The CPU 701 controls entire apparatus according to programs stored in the ROM 702 by using the RAM 703 as an operating region. A mask pattern to be described below is stored in the ROM 702. When the mask pattern is used for printing, the mask pattern is read out from the ROM 702 and the readout mask pattern is written in the RAM 703. A host device 704 connected to the outside of the printing apparatus is a supply source of image data. A host device 704 may be a form of a computer which creates and processes data, relating to printing images as well as a form of a reader unit for image reading. Image data, other commands, status signals, and the like are transmitted to/received between the controller 700 and the host device 704 through an interface 712.

An operation unit 705 is a group of switches for receiving an instruction inputted by an operator, and is provided with an electric source switch 706, a print switch 707 for instruction to start an printing operation, a recovery switch 708 for instructing start-up of maintenance processing to a print head, and the like.

The print head H1001 of the present embodiment is provided with a plurality of printing elements for ejecting ink as drops. Each of the printing elements includes an ink path leading ink to an ejection port and an electro-thermal transducing element (heater) 26 for causing film boiling in ink inside the ink path. In addition, a head driver 709 is a driver for driving the electro-thermal transducer element 26 separately. The CPU 701 controls the head driver 709 depending on position information of a carriage 1, which is obtained from an encoder sensor 714, and printing data, which is obtained from the I/F 712. The head driver 709 includes a shift register, which aligns printing data so as to correspond to the position of the electro-thermal transducer element 26, a latch circuit, which performs latching at appropriate timing, and a logical circuit element, which operates the electro-thermal transducer element 26 in synchronization with a driving timing signal.

A motor driver 711 is a driver for driving a carriage motor 2. The CPU 701 controls the motor driver 711 depending on the position information of the carriage 1, which is obtained from the encoder sensor 714. In addition, the motor driver 713 is a driver for driving a conveying motor 6 to be rotation power of a conveying roller 5. The CPU 701 controls this motor driver 713 while detecting conveying information obtained from an encoder light-receiving unit 11. An image is formed on print medium in a stepwise manner by CPU 701 controlling to repeat print scanning of the carriage 1 and a conveying operation of the print medium intermittently.

The characteristic features of the present invention will be described below in detail. In the printing apparatus of the present invention, a mask pattern used in multipass printing (multi-scans printing) varies depending on a color of ink to be used and a printing mode (multi-scans printing mode). In particular, the characteristic feature of the present invention is that mask patterns for plural kinds of achromatic color ink has a relationship which varies depending on the printing mode.

Figure 6:
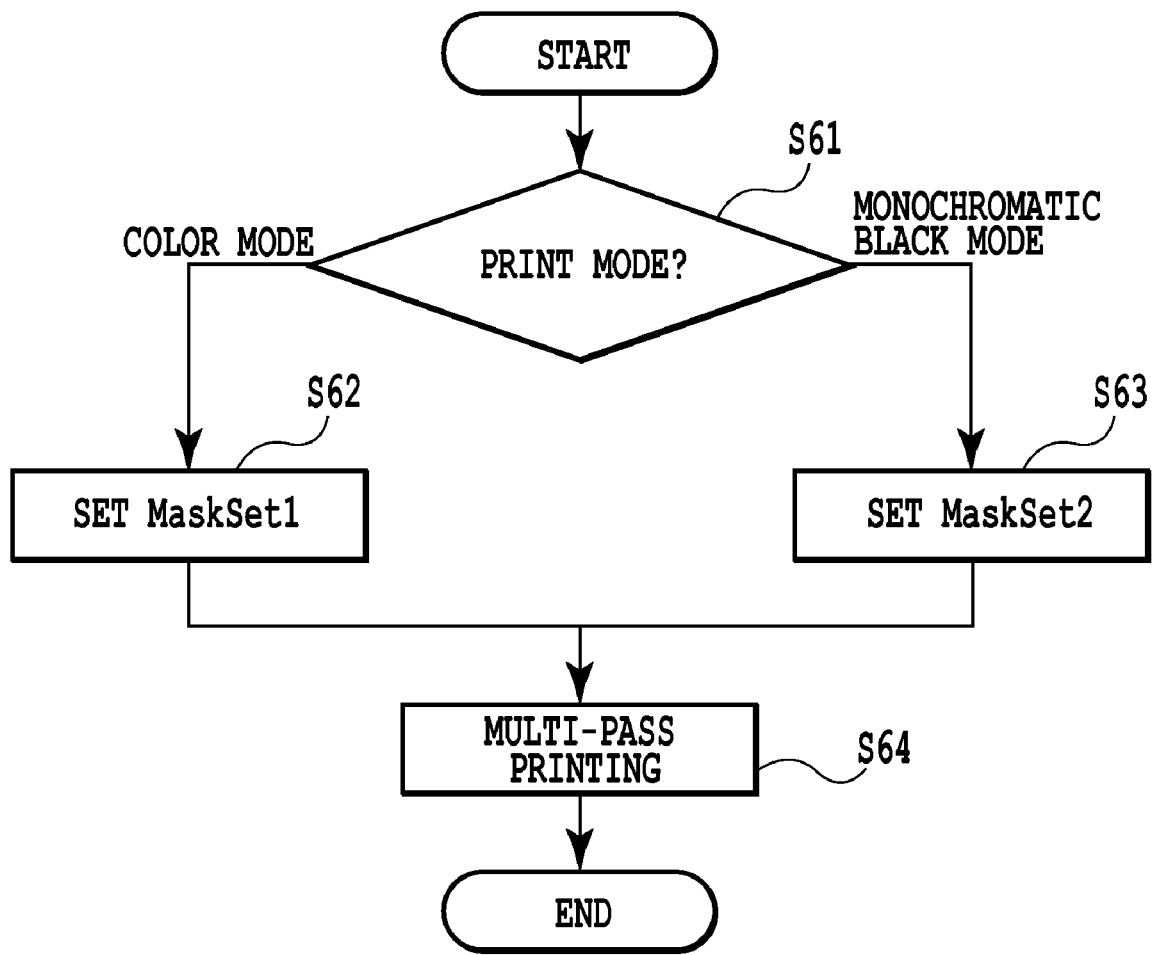
FIG. 6 is a flowchart for illustrating steps of setting a mask pattern performed by a CPU if a print start command is inputted.

FIG. 6 is a flowchart for illustrating processes of setting a mask pattern, which is performed by the CPU 701 when a print start command is inputted. When a print start command is inputted by the host device 704, at step S61, the CPU 701 analyzes received image data to determine whether color mode is set or monochrome black mode is set.

If it is determined that the color mode is set, the step proceeds to step S62 to set a set of mask patterns (MaskSet1 showed in FIG. 13) as mask patterns for color mode. Specifically, the set of mask patterns (MaskSet1) is read out from the ROM 702 and the readout mask patterns are stored in the RAM 703. In this manner, mask patterns to be used for printing in the color mode are set. On the other hand, if it is determined that the monochrome black mode is set, the step proceeds to step S63 to set a set of mask patterns (MaskSet2 showed in FIG. 14) as mask patterns for monochrome black mode. Specifically, the set (MaskSet2), which is different from MaskSet1, is readout from the ROM 702 and the readout mask patterns are stored in the RAM 703. In this manner, a mask pattern for printing in the monochrome black mode is set. Note that the setting of mask patterns means processing of reading out mask patterns from the ROM 702, or processing of reading out mask patterns from the ROM 702 and storing the readout mask patterns in the RAM 703.

When each mask pattern for each color is set at step S62 or S63, the step proceeds to step S64 to perform multipass printing (multi-scans printing) by using the set mask patterns. Specifically, image data corresponding to a unit region is divided into image data corresponding to each of plural times of scanning (pass) by the AND operation of the image data corresponding to the unit region of the print medium and the set mask pattern. Then, the multipass printing is performed by utilizing the image data corresponding to each scanning. As described above, the mask pattern is for generating image data corresponding to each of plural times of scanning (pass). With this, the present processing is finished.

Here, the multipass printing method will be briefly described additionally. The multipass printing means, as is well known, a printing method of completing an image of a unit region on a print medium by scanning the unit region with a print head two or more times.

Figure 7:
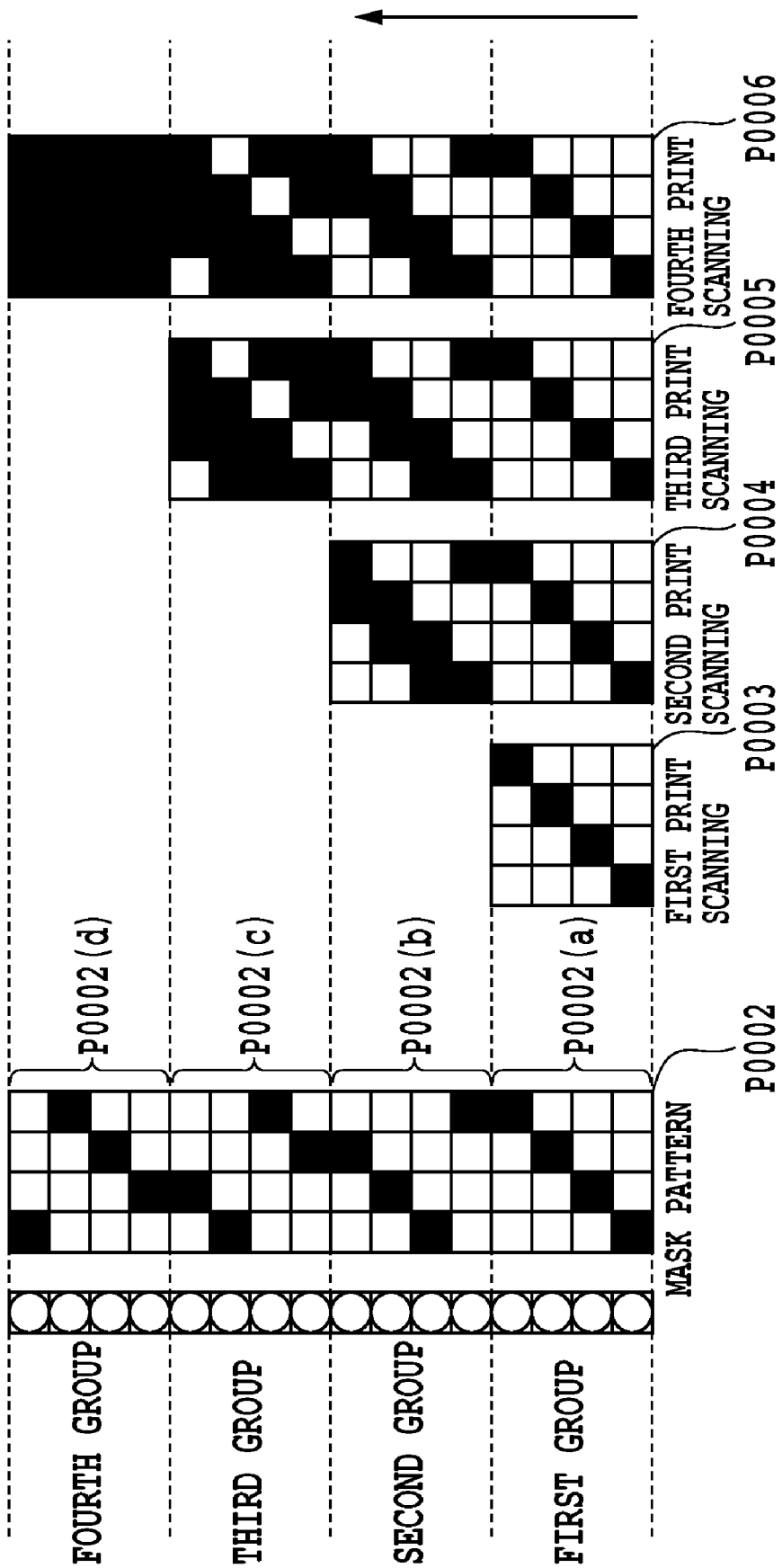
FIG. 7 is a view schematically showing a print element column and print pattern for one color in order to illustrate a multipass printing method.

FIG. 7 is a schematic view showing a print element column and print pattern for one color for illustrating the multipass printing method. The print head H1001 adopted for the present embodiment has a larger number of nozzles (print elements) in reality. However, for simplicity, the description will be given by using one example in which 16 nozzles are provided for one color. The nozzles are divided into first to fourth nozzle groups as shown in the figure, and each nozzle group includes four nozzles. A mask pattern P0002 is configured of first to fourth mask patterns P0002(a) to P0002(d). The first to fourth mask patterns P0002(a) to P0002(d) respectively define areas where the first to fourth nozzle groups are allowed to print. Black areas in the mask patterns show print permitted areas and white areas show print non-permitted areas. The first to fourth mask patterns P0002(a) to P0002(d) are configured to have a complementary relationship each other, and to complete printing of a region corresponding to 4-by-4 area when these four mask patterns are superimposed.

Patterns P0003 to P0006 are views showing how an image is completed by repeating print scanning. Each of these patterns P0003 to P0006 is image data obtained by thinning out the image data corresponding to a unit region of the print medium with the mask pattern P0002(a) to P0002(d). Every time each print scanning is finished, the print medium is conveyed by a width of the nozzle group (in this figure, by the distance of four nozzles) in a direction shown by the arrow in the figure (a direction intersecting with the print scanning) in relation to the print head. Accordingly, in the unit region of the print medium (region corresponding to the width of each nozzle group), an image is completed by superimposing the patterns P0003 to P0006 by four times of print scanning. As described above, to form an image on each unit region of the print medium by scanning for plural times by using a plurality of nozzle groups is effective to reduce variations, which are particular to nozzles, variations of conveying accuracy, and the like.

For simplicity, the mask pattern with 4-by-4 area region is shown here. However, in reality, a mask pattern with a wider region is prepared. As long as the mask patterns allocated to the nozzle groups have a complementary relationship, print permitted areas and print non-permitted areas may be arranged in any state.

In the present invention, several kinds of mask patterns satisfying such a complementary relationship are prepared for several colors of ink. Furthermore, the above-described plural mask patterns include at least Mask A, Mask B, and Mask C shown in FIGS. 13 or 14, which are mutually exclusive. Then, a mask pattern to correspond to each color of ink is selectively set from the plural kinds of the prepared mask patterns depending on the printing mode as described in FIG. 6. Note that the mutually-exclusive mask patterns in the present specification mean mask patterns having a relationship that any print permitted areas thereof in same print scanning are not overlapped. For example, a set of two mask patterns shown in FIGS. 13 and 14 are also one example of mutually-exclusive mask patterns. A mask pattern which is adaptable to the present invention is not limited to these mask patterns.

FIG. 9 is a table for illustrating contents of MaskSet1 set at step S62 and MaskSet2 set at step S63 of the flowchart shown in FIG. 6. Here, in particular, mask patterns for black ink (Bk), gray ink (Gray), and light gray ink (LGray) are shown. In the MaskSet1, which is selected if the color mode is set, Mask A is equally selected for black ink (Bk), gray ink (Gray), and light gray ink (LGray). On the other hand, in MaskSet2, which is selected if the monochrome black mode is set, the mutually-exclusive mask patterns are set, Mask A is for black ink, Mask B is for gray ink, and Mask C is for light gray ink.

As described above, mask patterns for achromatic color ink varies depending on the mode, that is, color mode or monochrome black mode, due to the following reason. Specifically, in the case of the color mode, the beading of different color inks tends to be more distinctive than that of similar color inks, so that an importance is placed on reduction of the beading of different color inks. For this reason, it is effective that the mutually-exclusive mask patterns are allocated to different colors of ink so that the different colors of ink would be mutually exclusive as much as possible. However, when such allocation is made, there is caused a situation that the same mask has to be allocated to the similar achromatic color inks in consideration of the relationship between the number of colors of ink and the number of passes for multipass printing. However, the beading of similar colors is relatively less distinctive in a color image. Thus, the above-mentioned mask allocation is effective. Therefore, in the case of the color mode, Maskset1 showed in FIG. 13 is used.

Here, the MaskSet1 showed in FIG. 13 will be described. The MaskSet1 is a set of mask patterns for multipass printing with four passes and includes four kind of mask patterns (Mask A, Mask B, Mask and Mask D). Each of Mask A, Mask B, Mask C and Mask D consisted of four mask patterns (1pass to 4pass) respectively. These four mask patterns have a complementary relationship, and when these are superimposed, 100% printing can be performed.

Mask A is a mask pattern corresponding to achromatic color ink such as black (Bk), gray (Gray) and light gray (LGray). On the other hand, Mask B, Mask C and Mask D are mask patterns corresponding to chromatic ink. Mask B corresponds to cyan-like ink, Mask C corresponds to secondary color ink and Mask D corresponds to magenta-like and yellow-like ink. Specifically, Mask B is a mask pattern corresponding to cyan (C) and light cyan (Lc). Mask C is a mask pattern corresponding to red (R) and green (G). Mask D is a mask pattern corresponding to magenta (M), light magenta (Lm) and yellow (Y).

These Mask A, Mask B, Mask C and Mask D are mutually exclusive. In color mode, it is an effective countermeasure to set different mask patterns for inks which are wanted to be suppressed beading. In the Maskset1, ten inks used in color mode are divided into four groups. Then the four different mask patterns, such as Mask A, Mask B, Mask C and Mask D are set for the four groups respectively in order to suppress the beading among the four groups. In the construction described above, beading of different color which tends to be distinctive in the color mode can be suppressed. In contrast, in the color mode, the beading of achromatic color inks is less distinctive than that of different color inks. Therefore, the same mask pattern (Mask A) is set for plural kind of achromatic color ink.

In contrast, if a monochrome image is printed with the combination of mask patterns used in the color mode, grains in the areas where the achromatic color ink are superimposedly printed are distinctive. Thus, beading and conveying unevenness are recognized. For this reason, in the monochrome black mode, it is effective that a plurality of mask patterns, which are mutually exclusive, are allocated to plural kinds of achromatic color ink so that the plural kinds of achromatic color ink would be mutually exclusive as much as possible. In the case of the monochrome black mode, color ink (chromatic ink) is hardly used. Thus, the beading of ink in the different colors is hardly generated, and thus to reduce the beading of ink in the different colors is not needed to be considered. Accordingly, the mutually-exclusive mask patterns can be preferentially allocated to the plural kinds of achromatic color ink. For this reason, in the monochrome black mode, Maskset2 showed in FIG. 14 is used.

Here, the Maskset2 showed in FIG. 14 will be described. The Maskset2 is a set of mask patterns for multipass printing with four passes and includes four kind of mask patterns (Mask A, Mask B, Mask and Mask D). Each of Mask A, Mask B, Mask C and Mask D consisted of four mask patterns (1pass to 4pass) respectively. These four mask patterns have a complementary relationship, and when these are superimposed, 100% printing can be performed.

Mask A is a mask pattern corresponding to black (Bk) and Mask B is a mask pattern corresponding to gray (Gray) and light cyan (Lc). Mask C is a mask pattern corresponding to light gray (LGray) and Mask D is a mask pattern corresponding to light magenta (Lm) and yellow (Y).

These Mask A, Mask B, Mask C and Mask D are mutually exclusive. In monochromatic black mode, it is an effective countermeasure to set different mask patterns for inks which are wanted to be suppressed beading. In the Maskset2, six inks used in monochromatic black mode are divided into four groups. Then the different mask patterns, such as Mask A, Mask B, Mask C and Mask D are set for the four groups in order to suppress the beading among the four groups. Specifically, the mutually-exclusive mask patterns are set for the plural kinds of achromatic color ink (Bk, Gray and LGray) which are mainly used in monochromatic black mode. In the construction described above, beading of achromatic color ink which tends to be distinctive in the monochromatic black mode can be suppressed.

As described above, in the present embodiment, in the color mode using the plural kinds of color ink (chromatic colors), the three kinds of achromatic color ink use the same mask pattern. In the monochrome black mode, which mainly uses achromatic color ink, the three kinds of achromatic color ink use mutually-exclusive mask patterns.

Figure 10A:
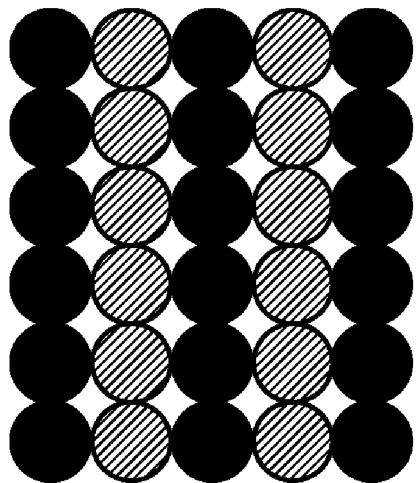
FIGS. 10A to 10C are views schematically illustrating the mechanism how conveying unevenness become indistinctive by employing the mask pattern of an embodiment to be applied to the present invention.
Figure 10B:
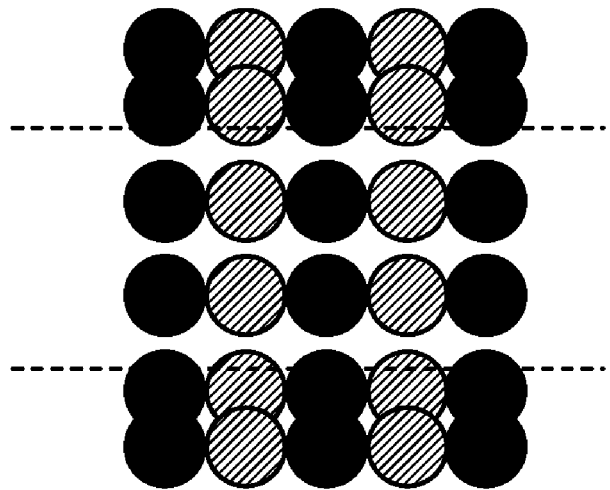
Figure 10C:
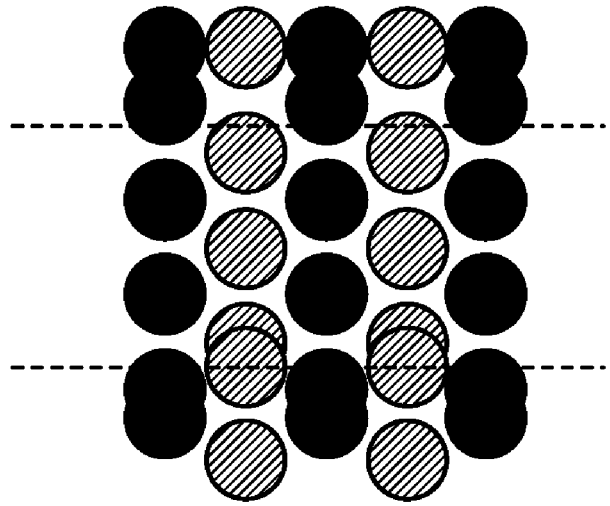

FIGS. 10A to 10C are views for schematically illustrating a mechanism how the conveying unevenness is made indistinctive by adopting the mask patterns of the present embodiment. In the figures, black and gray colored-circles respectively show printing positions of black dots and gray dots. For illustration, the black and gray dots are shifted in the main scanning direction (to the horizontal directions in the figure). However, these two colors of dots are printed in a same pixel in reality.

Firstly, FIG. 10A shows a printing state if conveying errors are not generated at all. It can be seen from the figure that black dots and gray dots are both arranged at equal intervals. In contrast, FIG. 10B shows a state where conveying unevenness is appeared in the case when the same mask pattern is used for both the black ink and gray ink. Since the same mask pattern is used for the both ink, positions of dots to be printed are equal in every print scanning. As a result, the effect of deviation among each print scanning, that is, the influence of variations of conveying amount among print scans can be seen in the same positions.

In contrast, FIG. 10C shows the influence of conveying unevenness in the case when exclusive mask patterns are used for black ink and gray ink. Though deviation among print scans is caused, the influence of the variations of the conveying amount among print scans can be seen in different positions for plane of black ink and plane of gray ink. Thus, compared with FIG. 10B, the area of white background is made entirely small. As a result, the unevenness of density in a sub-scanning direction, that is, variations of area factor is more suppressed than in the case of FIG. 10B. Thus, the conveying unevenness becomes less distinctive.

As described above, according to the present embodiment, same mask pattern is used for three kinds of achromatic color ink in the color mode, and mutually-exclusive mask patterns are used for three kinds of achromatic color ink in the monochrome black mode. With this, it is made possible that uniform images, in which beading and conveying unevenness are suppressed, can be outputted in both of the color and monochrome black modes.

And now, in the foregoing description, completely-mutually-exclusive mask patterns are used for three kinds of achromatic color ink in the monochrome black mode. However, these mask patterns may have some effects even though they are not completely exclusive. This is because as long as a mask pattern for black ink and a mask pattern for gray ink are different, the state as shown in FIG. 10C can be obtained. The state is where "the influence of the variations of the conveying amount among print scans can be seen in different positions for black ink and gray ink". Accordingly, the area of white background becomes smaller than in the case of FIG. 10B. For example, in the monochrome black mode, Mask A showed in FIG. 14 may be used as a mask pattern for black and Mask F showed in FIG. 8 may be used as a mask pattern for gray. Since the print permitted areas are partly overlapped in superimposing Mask A and Mask F, they are not completely exclusive. However, most print permitted areas are not overlapped in superimposing Mask A and Mask F. Therefore, beading and conveying unevenness can be suppressed effectively.

For another example, Mask A showed in FIG. 14 may be used as a mask pattern for black and Mask E showed in FIG. 8 may be used as a mask pattern for gray. There is more print permitted area overlapped in superimposing Mask A and Mask E than that in superimposing Mask A and Mask F. However, Mask E is different from Mask A. Therefore, using two different mask patterns, such as Mask A and Mask E, for black ink and gray ink respectively can suppress beading and conveying unevenness more effectively than using the same mask pattern, such as Mask A, for black ink and gray ink.

Second Embodiment

The second embodiment of the present invention will be described below. In the present embodiment, similar to the first embodiment, the ink jet printing apparatus described in FIGS. 1, 4, and 5 is used and mask patterns for three kinds of achromatic color ink is set according to the flowchart described in FIG. 6. In the present embodiment, mask patterns which are not exclusive completely are used for three kind of achromatic color ink.

In the present embodiment, the mask patterns disclosed as a prior art in Japanese Patent Laid-open No. 2006-44258 are applied for three kinds of achromatic color ink in the monochrome black mode. In contrast, in the color mode, the mask patterns disclosed in Japanese Patent Laid-open No. 2006-44258 are allocated for different colors of ink and the same mask pattern is allocated for three kinds of achromatic color ink.

Note that the mask patterns disclosed in Japanese Patent Laid-open No. 2006-44258 results in an arrangement pattern of print permitted areas obtained by a logical product of mask patterns has blue noise characteristics (that is, low-frequency components are less than high-frequency components), as will be described below. Here, "low-frequency components" mean frequency components present in a frequency range on the lower side (low-frequency range) from the center of a space frequency range where all the frequency components (power spectrum) are present. In addition, "high-frequency components" mean frequency components present on the higher side (high-frequency range) from the center of the space frequency range where all the frequency components (power spectrum) are present. Furthermore, "low-frequency components are less than high-frequency components" means that an integration value of the frequency components in the low-frequency range (low-frequency components) is smaller than that of the frequency components in the high-frequency range (high-frequency components). The "power spectrum" described above means radically averaged power spectrum, which is disclosed in T. Mitsa and K. J. Parker, "Digital Halftoning using a Blue Noise Mask", Proc. SPIE 1452, pp. 47-56 (1991) wherein two-dimensional frequency can be treated as one-dimensional parameter.

Figure 11A:
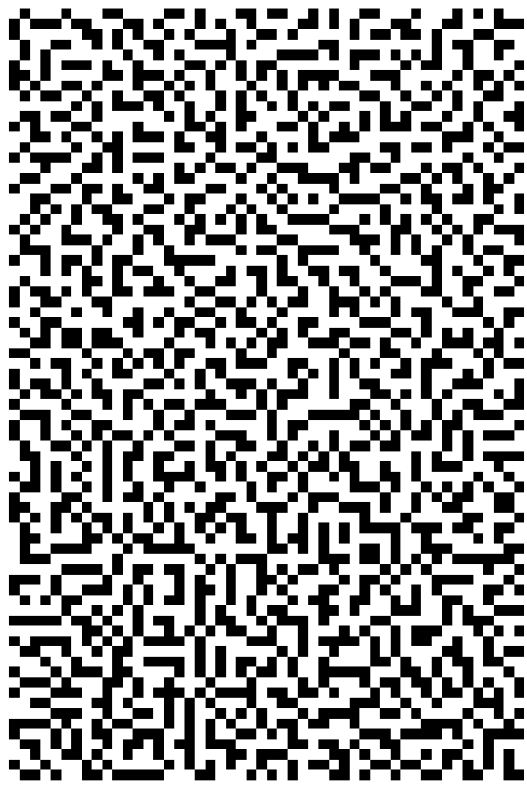
FIGS. 11A and 11B are views showing mask patterns for black ink and grey ink to be used in monochrome black mode of an embodiment to be applied to the present invention.
Figure 11B:

FIGS. 11A and 11B show mask patterns for black ink and gray ink, which are used in the monochrome black mode of the present embodiment. These two kinds of mask patterns are different from each other, but are not completely mutually exclusive.

Figure 12:
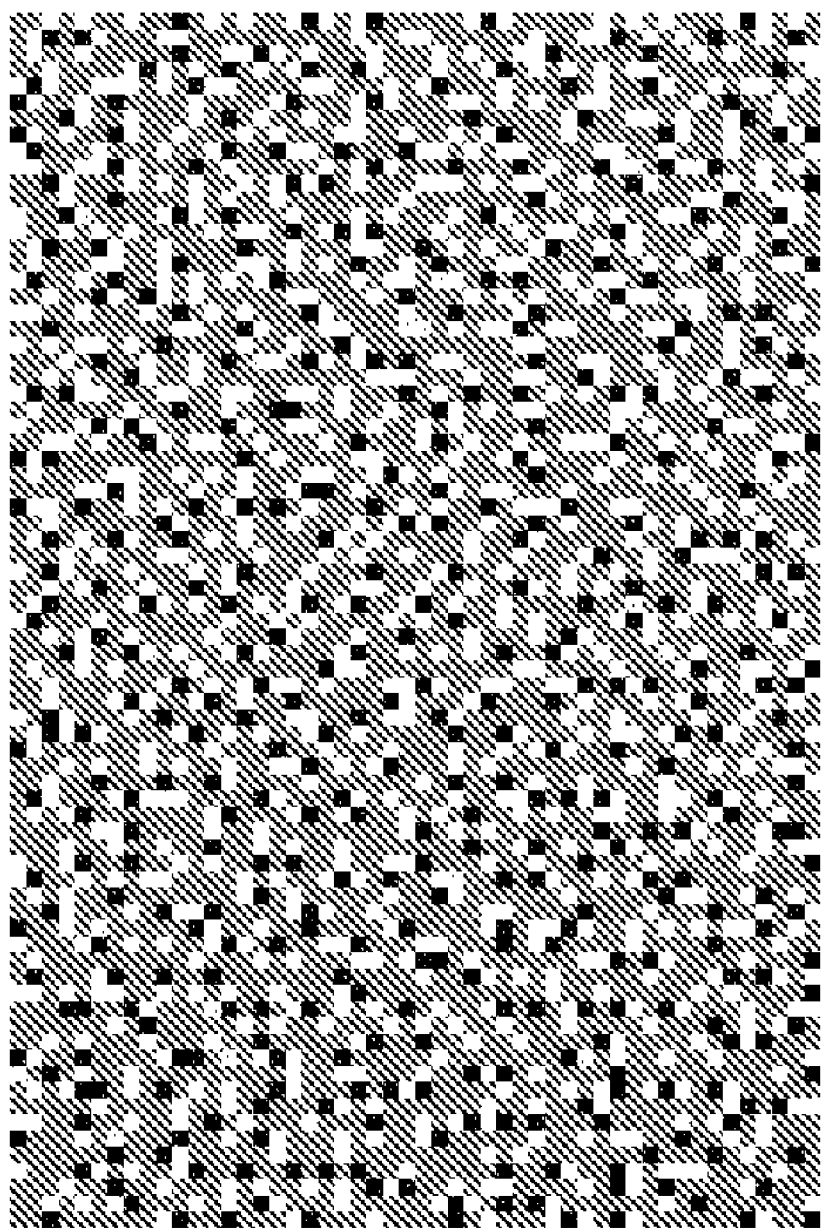
FIG. 12 is a view showing a result of the logical sum and logical product of print permitted areas of the mask patterns for a black ink and a grey ink.

FIG. 12 is a view showing the result of the logical addition and logical product of the print permitted areas of the mask pattern for black ink shown in FIG. 11A and the mask pattern for gray ink shown in FIG. 11B. In the figure, the areas shown in gray are areas where printing in any one of black ink and gray ink is permitted, whereas the areas shown in black are areas where printing in both black ink and gray ink is permitted. When such mask patterns are used, black ink and gray ink are superimposedly printed in the areas shown in black, which results in formation of grains here. However, as is known from FIG. 12, such areas (logical product area or logical addition area) are arranged with high dispersibility over the entire mask region, and are arrayed in a state where low-frequency components are less than high frequency components. As a result, even if grains are generated here, it can be said that these grains are less likely to deteriorate an image thanks to the effects similar to those disclosed in Japanese Patent Laid-open No. 2006-44258.

As described above, the arrangement pattern of the print permitted areas obtained by the logical product of plural mask patterns, which are set for the plural kinds of achromatic color ink in the monochrome black mode, has blue noise characteristics (that is, characteristics of having less low-frequency components than high-frequency components). Accordingly, printing positions in the same pass of the plural kinds of achromatic color ink can be differentiated, so that a monochrome image in which beading and conveying unevenness is suppressed can be obtained.

The present embodiment is characterized in that the combination of mask patterns allocated for each color is adjusted as needed depending on the combination of ink colors to be used. The object of above adjustment is to obtain the effects of the mask patterns disclosed in Japanese Patent Laid-open No. 2006-44258 in each of the color mode and the monochrome black mode to a maximum extent.

As described above, according to the present embodiment, as for the mask patterns for three kinds of achromatic color ink, the color mode uses the same kind of the mask patterns for the three inks, while the monochrome black mode uses different mask patterns for them, whose logical product operation resulting in a state with high dispersibility. With this, in both of the color and monochrome black modes, it is made possible that a uniform image in which beading and conveying unevenness is suppressed is outputted.

Other Embodiment

Note that the above-described two embodiments have been described by exemplary using the ink jet printing apparatus in which three kinds of black ink, gray ink, and light gray ink as achromatic color ink are mounted, but the present invention is not limited to these embodiments. The effects of the present invention can be sufficiently obtained as long as plural kinds of achromatic color ink (two, or four or more kinds) are prepared and achromatic color ink is more positively used in the monochrome black mode than chromatic color ink.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-100273, filed Apr. 6, 2007, which is hereby incorporated by reference herein in its entirety.

What is claimed is:

1. An ink jet printing method for carrying out multi-scans printing to complete an image to be printed in a unit region on a print medium by a plurality of scans of a print head relative to the unit region, the print head capable of ejecting at least a first achromatic color ink and a second achromatic color ink, comprising the steps of:
   determining whether to carry out the multi-scans printing in a color mode or in a monochrome black mode; and
   setting mask patterns used for carrying out the multi-scans printing according to a result determined in said determining step,
   wherein if it is determined that the multi-scans printing is carried out in the color mode in said determining step, the same mask patterns are set for the first and second achromatic color inks in said setting step, and
   if it is determined that the multi-scans printing is carried out in the monochrome black mode in said determining step, a plurality of different mask patterns are set for the first and second achromatic color inks in said setting step.

2. The ink jet printing method according to claim 1, wherein the plurality of different mask patterns are mutually exclusive.

3. The ink jet printing method according to claim 1, wherein an arrangement pattern of print permitted areas obtained by a logical product of the plurality of different mask patterns has a characteristic of having less low-frequency components than high-frequency components.

4. The ink jet printing method according to claim 1, wherein the first achromatic color ink is a black ink and the second achromatic color ink is a gray ink having higher lightness than the black ink.

5. An ink jet printing apparatus capable of carrying out multi-scans printing to complete an image to be printed in a unit region on a print medium by a plurality of scans of a print head relative to the unit region, the print head capable of ejecting at least a first achromatic color ink and a second achromatic color ink, the ink jet printing apparatus comprising:
   a setting unit capable of setting a color mode for carrying out the multi-scans printing and a monochrome black mode for carrying out the multi-scans printing; and
   a selecting unit which selects mask patterns used for carrying out the multi-scans printing according to the mode set by said setting unit,
   wherein said selecting unit selects the same mask patterns for the first and second achromatic color inks if the color mode is set by said setting unit, and said selecting unit selects a plurality of different mask patterns for the first and second achromatic color inks if the monochrome black mode is set by said setting unit.

6. The ink jet printing apparatus according to claim 5, wherein the plurality of different mask patterns are mutually exclusive.

7. The ink jet printing apparatus according to claim 5, wherein an arrangement pattern of print permitted areas obtained by a logical product of the plurality of different mask patterns has a characteristic of having less low-frequency components than high-frequency components.

* * * * *